Feb. 25, 1947.   R. E. KREMERS   2,416,484
PROCESS OF RECOVERING ALKALOIDS
Filed May 7, 1943
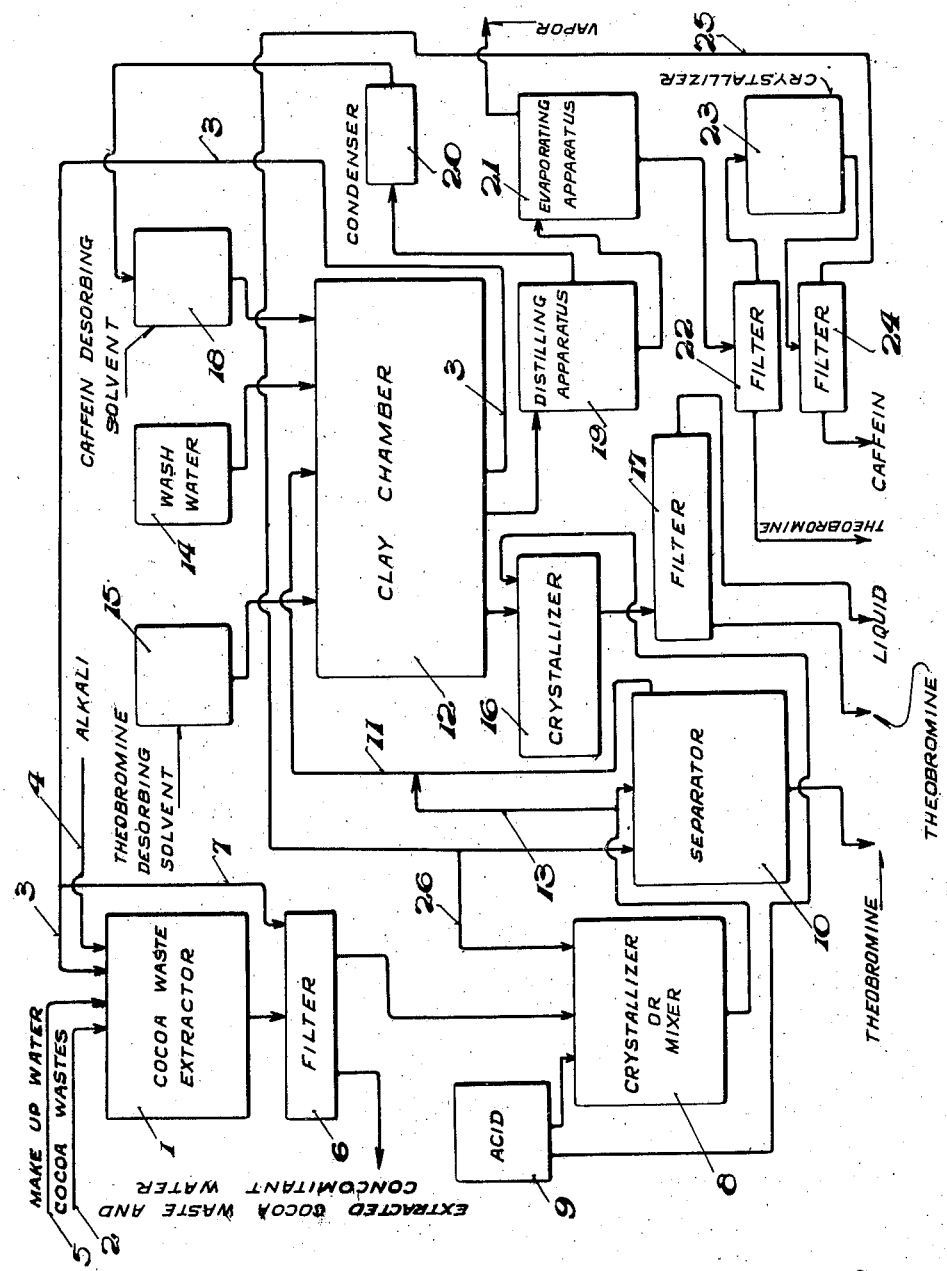
Inventor
*Roland E. Kremers*
By *Cameron, Kerkam + Sutton*
Attorneys

UNITED STATES PATENT OFFICE 2,416,484

PROCESS OF RECOVERING ALKALOIDS

Roland E. Kremers, Summit, N. J., assignor to General Foods Corporation, New York, N. Y., a corporation of Delaware Application May 7, 1943, Serial No. 486,073

14 Claims. (Cl. 260—256)

This invention relates to the recovery of theobromine from its aqueous solutions and, when caffein is also present in the solution, to the recovery of both alkaloids and their separation from one another.

The invention may be illustrated conveniently by describing its application to aqueous solutions obtained by the extraction of cocoa wastes, in which both theobromine and caffein are present, but it is to be understood that any other aqueous solution of theobromine, or of theobromine and caffein, may be similarly treated. Heretofore theobromine has been recovered from cocoa waste extracts by crystallization. Inasmuch as the yield thus obtained is a function of the concentration of theobromine in solution, the extracts are usually concentrated until they contain about 0.4% by weight of total alkaloids. However, there are well known difficulties in handling such concentrated extracts, and besides crystallization is still incomplete and yields only about 85% of the theobromine. Accumulation of other water-soluble extractives in the mother liquor limits its re-use for extraction and a substantial loss of theobromine results. On the other hand caffein, which constitutes approximately 15% of the total alkaloids, does not crystallize out because of its relatively high solubility in water and is generally discarded for lack of any practical and economical procedure for its recovery.

One of the objects of the present invention is to provide a simple, rapid and effective process for recovering theobromine, and also caffein when present, from aqueous solutions such as the cocoa waste extracts referred to above.

Another object is to eliminate the need for concentration of the extracts, as well as the disadvantages incident to the use of such concentrated extracts for crystallization.

Another object is to eliminate or greatly reduce the loss of alkaloids heretofore incident to the use of crystallization procedures.

A further object is to enable the simultaneous recovery of both theobromine and caffein from their aqueous solutions, as well as to provide for their subsequent separation in a simple and economical manner.

A still further object is to provide for the effective recovery of theobromine, and also caffein if present, from dilute as well as from concentrated aqueous solutions, and as a concomitant to increase the efficiency of extraction of materials such as cocoa wastes by permitting the use of dilute solutions.

The invention is based on the following discoveries, which make it possible to recover the alkaloids from their aqueous solutions by simple adsorption and desorption procedures, and also to separate the caffein and theobromine when desired by preferential desorption:

(1) Theobromine is effectively adsorbed on clay from either acid or slightly alkaline aqueous solutions, the pH values of which are about 8.5 or less. Caffein, if present, is also effectively adsorbed on the clay at the same time.

(2) Theobromine is effectively desorbed from the clay by aqueous solutions of relatively high alkalinity, the pH values of which are about 10.5 or above, but caffein is not. Hence if both alkaloids are present, theobromine is preferentially desorbed under these conditions.

(3) Caffein is effectively desorbed from the clay by non-chlorinated organic solvents of relatively high di-pole moment (hereinafter referred to as polar solvents), but theobromine is not. Hence if both alkaloids are present, caffein is preferentially desorbed under these conditions.

The term "desorption" as used above and throughout the specification and claims includes both overcoming the attractive forces which bind the alkaloid to the clay and the solution of the alkaloid in the desorbing solution or eluent.

The foregoing discoveries make it possible to separate and recover theobromine from aqueous solutions, regardless of concentration, by simple adsorption and desorption methods, the theobromine being then separated from the desorbing solution in any suitable manner. If caffein is present, it too is adsorbed on the clay, whereupon preferential desorption of either alkaloid followed by desorption of the other alkaloid may be carried out according to the above principles. Thereafter the separated alkaloids may be recovered from their respective desorbing solutions in any desired manner.

The various ways in which these principles may be applied and utilized, together with the resulting advantages, may again be conveniently explained by describing their application to cocoa waste extracts. The extraction of cocoa wastes is commonly carried out at pH values of about 10 or over. When the alkaloids are adsorbed directly from the extracts, it is therefore necessary first to adjust their pH value to 8.5 or below. On the other hand, the crystallization of theobromine from cocoa waste extracts is commonly carried out at pH between 6 and 8, so that when adsorption is used only to recover the alkaloids remaining in the mother liquor after crystallization, no preliminary pH adjustment is required.

The amount of caffein present in cocoa waste extracts is small as compared to the amount of theobromine. On the other hand, if a large part of the theobromine is first crystallized from the extracts, the proportions of the two alkaloids remaining in the mother liquor may become comparable. When the extract or mother liquor contains a small amount of caffein as compared to theobromine, it is desirable to build up the amount of caffein on the clay to a suitable value before desorbing it therefrom. Adsorption may accordingly be repeated many times, with intervening preferential desorption of theobromine, until the amount of caffein accumulated on the clay becomes comparable to the amount of theobromine adsorbed, after which either alkaloid may be preferentially desorbed before the other.

On the other hand, the amount of theobromine which the clay is capable of adsorbing from solution decreases as the amount of caffein accumulated on the clay increases. Should the latter become so large that very little theobromine can be adsorbed, the caffein may then be preferentially desorbed, leaving the theobromine on the clay to be desorbed either immediately or together with the greater amount accumulated from subsequent adsorptions. In other words, when the relative amounts of the two alkaloids on the clay are not widely different, either may be preferentially desorbed before the other with effective separation of the two, but if the amount of one alkaloid substantially exceeds the other, it is preferable to desorb the greater amount preferentially.

The extraction of cocoa wastes is generally carried out in the presence of lime or other alkali and some of the theobromine in the extract may be in the form of a metal salt. Theobromine is nevertheless adsorbed from such extracts as free alkaloid, the alkali remaining in solution.

The following examples illustrate the effectiveness of adsorption and desorption of theobromine and caffein in my process. In many of these tests, equilibrium was eventually attained between the alkaloids in solution and the alkaloids on the clay, so that not all of the alkaloids were adsorbed or desorbed. In practice, of course, it will usually be desirable to employ sufficient clay to adsorb all of the alkaloids in solution. Similarly, sufficient desorbing solvent may be used to desorb the total amount of alkaloids present on the clay after each adsorbing operation, but it may be preferable in a series of operations to leave a constant, relatively small amount of alkaloids on the clay after each desorption.

Examples 1 to 8

These examples indicate the effectiveness with which theobromine is adsorbed on clay from solutions whose pH values are not appreciably greater than 8.5.

In each example, an aqueous solution of U. S. P. theobromine containing 0.5 gram of theobromine per liter of solution was mixed with 20 parts of clay to 1 part of theobromine. The mixture was vigorously agitated for 30 minutes, the clay then separated from the solution, and the solution then analyzed for unadsorbed theobromine.

| Example number | Type of clay | pH of mixture | Amount of theobromine adsorbed |
|---|---|---|---|
| | | | Percent |
| 1 | XL Superfine English fuller's earth | 8.0 | 82 |
| 2 | XL fuller's earth | 8.0 | 83 |
| 3 | Fuller's earth No. 2 | 7.6 | 82 |
| 4 | XL fuller's earth No. 1 | 7.9 | 83 |
| 5 | XL fuller's earth No. 2 | 7.9 | 81 |
| 6 | XL fuller's earth No. 3 | 7.7 | 88 |
| 7 | XL fuller's earth No. 4 | 7.7 | 86 |
| 8 | XL fuller's earth No. 5 | 8.0 | 84 |

Examples 9 to 14

These examples illustrate the effect of pH variation on the adsorption of theobromine by clay.

In each example, an aqueous solution of U. S. P. theobromine containing 0.5 gram of theobromine per liter of solution was mixed with XL fuller's earth and the pH of the resulting mixture adjusted by the addition of suitable amounts of hydrochloric acid or sodium hydroxide. The mixture was then agitated for 30 minutes, following which the clay was separated from the solution and the solution analyzed for unadsorbed theobromine.

| Example number | Ratio of clay to theobromine | pH of mixture | Amount of theobromine adsorbed |
|---|---|---|---|
| | | | Percent |
| 9 | 20:1 | 4.6 | 87 |
| 10 | 20:1 | 8.4 | 82 |
| 11 | 20:1 | 11.2 | 10 |
| 12 | 50:1 | 5.2 | 90 |
| 13 | 50:1 | 8.4 | 83 |
| 14 | 50:1 | 11.2 | 14 |

It will be observed that the adsorption of theobromine was large for acid or alkaline solutions up to pH 8.4 but low for solutions of high alkalinity.

Examples 15 to 17

These examples illustrate the effectiveness with which both caffein and theobromine can be adsorbed on clay.

In Example 15, the two alkaloids were adsorbed simultaneously from an aqueous cocoa waste extract containing 0.491% total alkaloids. After adjustment of pH to 4.9 by the addition of hydrochloric acid, the extract was agitated for 30 minutes with 16 parts of XL fuller's earth to 1 part total alkaloids. Total alkaloids remaining in solution after this treatment were 0.064%, 87% of the total alkaloids having been adsorbed.

In Examples 16 and 17, the two alkaloids were adsorbed simultaneously from mother liquors (pH about 5.5) remaining after crystallization of most of the theobromine from aqueous cocoa waste extracts. The ratio of clay to total alkaloids was 31 in Example 16 and 17 in Example 17.

| Ex. No. | Percent caffein in solution | | Percent theobromine in solution | | Percent adsorbed | |
|---|---|---|---|---|---|---|
| | Before adsorption | After adsorption | Before adsorption | After adsorption | Caffein | Theobromine |
| 16 | 0.039 | 0.005 | 0.120 | 0.016 | 88 | 87 |
| 17 | 0.046 | 0.006 | 0.142 | 0.014 | 87 | 90 |

Examples 18 to 24

These examples show that theobromine can be effectively desorbed by aqueous solutions of relatively high alkalinity.

XL fuller's earth having 9.1% by weight of adsorbed theobromine was mixed with equal parts of filter aid and agitated thoroughly with various amounts of aqueous solutions of different alkaline compounds and at various temperatures. Thereafter the clay and filter aid mixture was centrifuged from the desorbing solutions and the latter analyzed for desorbed theobromine.

| Ex. No. | Desorbing solution | pH | Temp., °C. | Ratio of solution to theobromine+clay | Percent of theobromine desorbed |
|---|---|---|---|---|---|
| 18 | 5% trisodium phosphate. | 11.3 | 26 | 200 | 93 |
| 19 | ----do---- | 11.3 | 70 | 200 | 95 |
| 20 | ----do---- | 11.5 | 55 | 100 | 95 |
| 21 | 0.5N sodium hydroxide. | 13.0 | 26 | 200 | 97 |
| 22 | 0.125N sodium hydroxide. | 12.3 | 70 | 200 | 99 |
| 23 | 0.05N sodium hydroxide. | 12.2 | 26 | 200 | 91 |
| 24 | 0.1N sodium hydroxide. | 12.0 | 26 | 20 | 97 |

Examples 25 to 27

These examples confirm the effectiveness of theobromine desorption by solutions of relatively high alkalinity as shown by Examples 18–24, and also show the ineffectiveness of caffein desorption by these solutions; i. e., they show the effectiveness of preferential theobromine desorption.

XL fuller's earth having known amounts of adsorbed theobromine and caffein was agitated for 30 minutes with a 0.5N sodium hydroxide solution (pH=11.9), the ratio of solution to clay being 20 to 1. Thereafter the solution was separated from the clay and analyzed for desorbed theobromine and caffein. The results were as follows:

| Ex. No. | Percent on clay before desorption | | Percent on clay after desorption | | Percent desorbed | |
|---|---|---|---|---|---|---|
| | Theobromine | Caffein | Theobromine | Caffein | Theobromine | Caffein |
| 25 | 2.43 | 1.22 | 0.17 | 1.18 | 93 | 3 |
| 26 | 2.33 | 1.85 | 0.35 | 1.82 | 85 | 2 |
| 27 | 2.91 | 2.62 | 1.02 | 2.59 | 65 | 1 |

Examples 28 to 42

These examples show the effectiveness of desorption of caffein from clay by organic non-chlorinated polar solvents. Examples of such solvents are methyl alcohol, ethyl alcohol, acetone, methyl acetate, pyridine, aniline, piperidine, ethanolamine, diethanolamine, etc. It is to be understood, however, that my invention is not restricted to the use of single solvents since caffein is effectively desorbed by mixtures of these solvents with one another or with organic components of relatively low polarity and also inorganic solvents such as water. It is necessary only that one of the components of such mixtures be an organic non-chlorinated solvent of relatively high polarity The results obtained with various desorbing solvents and mixtures thereof are shown in the following table In each example, 6 grams of clay having about 0.80 gram of adsorbed caffein were agitated with 100 cc. of the desorbing solvent or mixture of solvents, after which the clay was separated and the amount of desorbed caffein determined by analysis.

| Example number | Desorbing solvent | Percent caffein desorbed |
|---|---|---|
| 28 | Methanol | 65 |
| 29 | Acetone | 55 |
| 30 | Methyl acetate | 46 |
| 31 | 50% methanol—50% acetone | 86 |
| 32 | 40% methanol—40% acetone—20% methyl acetate. | 81 |
| 33 | 50% methanol—50% methyl acetone [1] | 79 |
| 34 | 50% methanol—50% trichlorethylene | 70 |
| 35 | 50% methanol—50% dichlormethane | 76 |
| 36 | 50% methanol—50% chloroform | 75 |
| 37 | 30% methanol—30% acetone—40% dichlormethane. | 80 |
| 38 | 35% methanol—35% acetone—30% chloroform. | 84 |
| 39 | 48% methanol—48% acetone—4% water | 60 |
| 40 | 10% methanol—80% acetone—10% water | 55 |
| 41 | 20% methanol—60% acetone—20% water | 55 |
| 42 | 30% methanol—30% acetone—40% water | 45 |

[1] A commercial mixture of methanol, acetone, and methyl acetate.

Examples 43 and 44

These examples confirm the effectiveness of caffein desorption by organic solvents as illustrated above, and also show the ineffectiveness of theobromine desorption by these solvents, i. e., they illustrate the effectiveness of preferential desorption of caffein.

XL fuller's earth having known amounts of adsorbed caffein and theobromine was agitated for 30 minutes with a mixture of approximately equal volumes of methanol and trichlorethylene, the ratio of methanol-trichlorethylene mixture to clay being about 50 to 1. The solution was then separated from the clay and analyzed for desorbed caffein and theobromine. The results were as follows:

| Ex. No. | Percent on clay before desorption | | Percent on clay after desorption | | Percent desorbed | |
|---|---|---|---|---|---|---|
| | Caffein | Theobromine | Caffein | Theobromine | Caffein | Theobromine |
| 43 | 11.9 | 0.4 | 0.0 | 0.4 | 100 | 0.0 |
| 44 | 11.9 | 0.4 | 0.0 | 0.4 | 100 | 0.0 |

Examples 45 to 50

Examples 45 to 50 indicate the effectiveness with which theobromine and caffein can be adsorbed on clay from their aqueous solution, and then separated and recovered independently by preferential theobromine desorption according to Examples 25 to 27, followed by caffein desorption according to Examples 28 to 42.

Approximately constant total amounts but varying proportions of the two alkaloids were adsorbed on clay by percolating 150 ml. of aqueous solutions thereof through a column comprising a mixture of 3 gm. XL clay and 3 gm. filter aid. After each adsorption the column was washed with 50 ml. of water and the theobromine eluted by percolating 75 ml. of 0.1N sodium hydroxide solution through the clay. The caffein was then eluted by percolating 100 ml. of a solution comprising 40 ml. methanol, 40 ml. acetone, and 20 ml. water. The results are shown in the following table:

| Ex. No. | Mgs. adsorbed | | Percent theobromine desorbed | Percent caffein desorbed |
|---|---|---|---|---|
| | Theobromine | Caffein | | |
| 45 | 28.7 | 9.7 | 96.8 | 91.6 |
| 46 | 28.7 | 9.7 | 99.3 | 84.5 |
| 47 | 19.1 | 19.4 | 100.0 | 97.4 |
| 48 | 19.1 | 19.4 | 98.5 | 99.0 |
| 49 | 9.2 | 29.1 | 100.0 | 97.0 |
| 50 | 9.2 | 29.1 | 100.0 | 98.0 |

The accompanying flow sheet illustrates a procedure suitable for use in applying the invention either directly to cocoa waste extracts or to the mother liquor remaining after crystallization of part of the theobromine from such extracts, it being understood, however, that this procedure is given by way of example and is not to be construed as limiting the scope of the invention, reference being had for the latter purpose to the appended claims.

Cocoa wastes introduced into extractor 1 through the line 2 are extracted for their theobromine and caffein content in accordance with the well-known practice in the art. The extracting solution enters the extractor from line 3 and, as explained hereinafter, is preferably a recycled solution from which theobromine and caffein have been adsorbed on clay. Hence the pH of the recycled solution is not appreciably greater than 8.5, and sufficient alkali is added to the extractor by the line 4 to bring the pH therein to the usual value of 10 or above. Since some water is lost by entrainment with the discarded cocoa wastes, an appropriate quantity of make-up water is also added to extractor 1 by the line 5. The extract from the extractor is filtered in filter 6 and the remaining wastes are washed free of residual extract with part of the recycled solution, for which purpose line 3 is connected with filter 6 by line 7.

In case part of the theobromine is to be recovered by crystallization in the usual manner, the filtered extract together with the washings is then passed to the crystallizer 8, where its pH is adjusted to a value between 6 and 8 by the addition of acid from the tank 9. Any suitable acid may be employed for this purpose, as for example, sulphuric or hydrochloric acid. The mother liquor with the crystallized theobromine is then passed to the separator 10 where the crystallized theobromine is removed by settling. The mother liquor, being at a pH between 6 and 8, may then be passed through the line 11 to the clay chamber 12 for adsorption.

In case crystallization of the theobromine is not desired, the crystallizer 8 serves merely as a mixer in which the pH of the extract is adjusted by acid from tank 9 to a value not appreciably greater than 8.5, but not low enough to cause the theobromine to crystallize. In general, a pH value between 8.0 and 8.5 will be found satisfactory. The extract is then passed directly to the clay chamber 12 through the lines 13 and 11, bypassing the separator 10 which may in this case be omitted.

The flow of liquid extract through clay chamber 12 is preferably continued until alkaloid begins to appear in the outgoing liquid. Thereupon, preferential desorption of either caffein or theobromine is carried out, depending on which alkaloid is in excess upon the clay. In the case of crystallization of theobromine in the usual manner with about 85% yield, the proportions of the two alkaloids will be comparable and they may be separately desorbed after each adsorption in whichever sequence is desired, or they may be preferentially desorbed in alternation between successive adsorptions. On the other hand, since any uncrystallized theobromine is recovered by adsorption, it may be desirable to work with less concentrated extracts as explained above. In this case the yield of theobromine by crystallization is reduced so that the quantity of it remaining in the mother liquor will exceed the quantity of caffein, which is also the case when the extract is treated without crystallization. In either of these cases, it is preferable to desorb the theobromine preferentially after each adsorption until the desired amount of caffein has accumulated on the clay to warrant its desorption, and the operation will be so described.

A small amount of cocoa waste extract will remain in chamber 12 following adsorption and in order to prevent inclusion thereof with the subsequently desorbed theobromine, wash water from tank 14 may be passed through chamber 12 and added to the solution recycled through the line 3.

The desorption of theobromine is then effected by passing through chamber 12 an alkaline solution from tank 15 having a pH value not appreciably less than 10.5, as for example a 0.5 normal solution of sodium hydroxide. The desorbing solution passes from chamber 12 to crystallizer 16 and, following desorption, the clay in chamber 12 is preferably washed free from desorbing solution with wash water from tank 14, the washings being added to the solution in crystallizer 16. Sufficient acid from tank 9 is added to the solution in crystallizer 16 to bring its pH to a value between 6 and 8. The desorbed theobromine crystallizes out at these pH values and is separated from the mother liquor in filter 17. The filtered theobromine may be purified by any known method, as for example, by dissolving in an appropriate solvent, treating with charcoal to remove coloring impurities, and finally recrystallizing.

Because of the effectiveness with which theobromine is desorbed in clay chamber 12, the solution in crystallizer 16 is highly concentrated. For example, its concentration may be more than ten times that of the extract supplied from extractor 1. Consequently, the crystallization of theobromine from the solution in crystallizer 16 is for all practical purposes complete. Moreover, the desorption of theobromine from clay chamber 12 is highly selective, so that only very small amounts of caffein are simultaneously desorbed from the clay. Consequently, the motor liquor leaving filter 17 will contain insignificant amounts of theobromine and caffein which usually will not economically warrant its return to clay chamber 12. Moreover, recycling this mother liquor through the line 3 will generally increase the filtering pressure required in filter 6 due to the presence of sodium salts in the mother liquor. Hence the mother liquor from filter 17 will generally be discarded.

Following theobromine desorption, the chamber 12 is again used to adsorb more theobromine and caffein, and alternate adsorption of both theobromine and caffein and preferential desorption of theobromine is continued until enough caffein has accumulated on the clay to make its desorption therefrom desirable. During these operations the build-up of caffein on the clay does not affect the preferential desorption of theobromine or its recovery from the desorbing solution, these operations continuing as described above.

When the desired amount of caffein has accumulated, it may be desorbed either before or after the theobromine as explained above. In either case, however, the caffein is desorbed by passing a solvent of the kind referred to above from tank 18 through clay chamber 12, as for example a mixture of acetone, methanol, and water. The desorbing mixture passes from clay chamber 12 to distilling apparatus 19 and, following desorption, the clay in chamber 12 is washed free from desorbing solution with wash water from tank 14, the washings being added to the solution in distilling apparatus 19. The desorbing mixture driven off in apparatus 19 is condensed in condenser 20, and returned to tank 18 for reuse. On recycling of this mixture, repeated wash water additions may make it necessary to remove surplus water in any suitable manner.

The residue in distilling apparatus 19 is essentially an aqueous solution of caffein containing minor proportions of acetone and methanol and a minor proportion of theobromine simultaneously desorbed from the clay. This solution is passed to evaporating apparatus 21 where it is concentrated to a point permitting efficient crystallization of caffein, the last remaining amounts of acetone and methanol being driven off at the same time. Since theobromine is much less soluble than caffein, the minor proportion of theobromine crystallizes out in evaporating apparatus 21 and may be separated by filter 22. The remaining solution of caffein is passed to crystallizer 23 and cooled to room temperature to crystallize the caffein which is then separated in the filter 24. The remaining solution is recycled through the line 25 to the separator 10, or in case preliminary crystallization of theobromine is not carried out, through the lines 25 and 26 to the mixer 8. The theobromine obtained from filter 22 may be added to the theobromine from filter 17 for purification, as may also the theobromine obtained in the separator 10 when the procedure of crystallizing it from the mother liquor is used. The caffein from filter 24 may be purified in any suitable manner, as for example by dissolving it in an appropriate solvent, treating with charcoal for the removal of coloring impurities, and finally recrystallizing.

With both theobromine and caffein desorbed from the clay, the same cycle of adsorbing and desorbing operations may be repeated as often as may be desired. Thus, a continuous process is provided for recovering the two alkaloids from their solution obtained by extraction of the wastes. Moreover, since the theobromine is crystallized from the desorbing solution, it is possible to carry out the extraction of the wastes with exceptionally large quantities of extracting solution with consequent more efficient extraction of the wastes. Thus the process of the invention may be applied to extracts of such low concentration that ordinarily their processing would not be warranted in view of the very low yields of theobromine by crystallization. On the other hand, if part of the theobromine is to be removed by crystallization before adsorption, it is not necessary that crystallization be carried out to the greatest practicable extent, inasmuch as the uncrystallized portion of the theobromine is recovered by the subsequent adsorbing and desorbing operations. Therefore the extract again does not need to be concentrated to the extent heretofore practiced.

While the foregoing procedures have been described in connection with a single clay chamber, it will be understood that any number of chambers may be employed. In many cases, for example, it will be found more economical to employ two series or groups of chambers respectively operated for adsorption and desorption with the chambers of either group being transferred to the other group in accordance with well-known countercurrent principles. The experienced operator, of course, will readily recognize the changes necessary to adapt the apparatus which has been described to any conditions which may be encountered in practice.

It is to be expressly understood that the examples and detailed procedures set forth above are for purposes of illustration only, and that various changes can be made by those skilled in the art without departing from the spirit of the invention. Accordingly reference should be had to the appended claims for a definition of the limits of the invention.

What is claimed is:

1. The process of recovering theobromine from its aqueous solutions which comprises adsorbing the theobromine on clay from an aqueous solution having a pH not substantially greater than 8.5, desorbing the theobromine from the clay in an aqueous solution having a pH not substantially less than 10.5, and recovering the theobromine from the desorbing solution.

2. The process of recovering theobromine from its aqueous solutions which comprises separating part of the theobromine from the solution by crystallization, adsorbing the remaining theobromine on clay at a pH not substantially greater than 8.5, desorbing the theobromine from the clay in an aqueous solution having a pH not substantially less than 10.5, and recovering the theobromine from the desorbing solution.

3. The process of recovering the alkaloids theobromine and caffein from their aqueous solutions which comprises adsorbing said alkaloids on clay from an aqueous solution having a pH not substantially greater than 8.5, then preferentially desorbing one of said alkaloids and thereafter desorbing the other alkaloid from the clay, the theobromine being desorbed in an aqueous solution having a pH not substantially less than 10.5 and the caffein in a non-chlorinated, polar, organic solvent, and then recovering said alkaloids from their respective desorbing solutions.

4. The process of recovering theobromine and caffein from their aqueous solutions which comprises adsorbing the theobromine and caffein on clay from an aqueous solution having a pH not substantially greater than 8.5, preferentially desorbing the theobromine from the clay in an aqueous solution having a pH not substantially less than 10.5, desorbing the caffein from the clay in a non-chlorinated, polar, organic solvent, and recovering the caffein and theobromine from their respective desorbing solutions.

5. The process of recovering theobromine and caffein from their aqueous solutions which comprises adsorbing the theobromine and caffein on clay from an aqueous solution having a pH not substantially greater than 8.5, preferentially desorbing the caffein from the clay in a non-chlorinated, polar, organic solvent, desorbing the theobromine from the clay in an aqueous solution having a pH not substantially less than 10.5, and then recovering the caffein and theobromine from their respective desorbing solutions.

6. The process of extracting and recovering alkaloids from cocoa products which comprises extracting said products with water to form an aqueous solution of theobromine and caffein, adsorbing said alkaloids on clay from said solution at a pH not substantially greater than 8.5, preferentially desorbing one of said alkaloids and then desorbing the other of said alkaloids from the clay, the theobromine being desorbed in an aqueous solution having a pH not substantially less than 10.5 and the caffein being desorbed in a non-chlorinated, polar, organic solvent, and then recovering said alkaloids from their respective desorbing solutions.

7. The process of extracting and recovering alkaloids from cocoa products which comprises extracting said products with water to form an aqueous solution of theobromine and caffein, adsorbing said alkaloids on clay from said solution at a pH not substantially greater than 8.5, preferentially desorbing the theobromine in an aqueous solution having a pH not substantially less than 10.5, desorbing the caffein in a non-chlorinated, polar, organic solvent, and then recovering the caffein and theobromine from their respective desorbing solutions.

8. The process of extracting and recovering alkaloids from cocoa products which comprises extracting said products with water to form an aqueous solution of theobromine and caffein, adsorbing said alkaloids on clay from said solution at a pH not substantially greater than 8.5, preferentially desorbing the theobromine in an aqueous solution having a pH not substantially less than 10.5, repeating said adsorption and preferential desorption steps until the amount of adsorbed caffein reaches a value desired for desorption, then preferentially desorbing one of said alkaloids from the clay and thereafter desorbing the other alkaloid, the caffein being desorbed in a non-chlorinated, polar, organic solvent, and recovering the caffein and theobromine from their respective desorbing solutions.

9. The process of extracting and recovering alkaloids from cocoa products which comprises extracting said products with water to form an aqueous solution of theobromine and caffein, separating part of the theobromine from said solution by crystallization, adsorbing the remaining alkaloids on clay from said solution at a pH not substantially greater than 8.5, preferentially desorbing one of said alkaloids and thereafter desorbing the other of said alkaloids from the clay, the theobromine being desorbed in an aqueous solution having a pH not substantially less than 10.5 and the caffein in a non-chlorinated, polar, organic solvent, and recovering said alkaloids from their respective desorbing solutions.

10. The process of recovering theobromine from clay which comprises desorbing the theobromine from the clay in an aqueous solution having a pH not substantially less than 10.5 and recovering the theobromine from the desorbing solution.

11. The process of recovering the alkaloids theobromine and caffein from clay which comprises preferentially desorbing one of said alkaloids and thereafter desorbing the other alkaloid from the clay, the theobromine being desorbed in an aqueous solution having a pH not substantially less than 10.5 and the caffein in a non-chlorinated, polar, organic solvent, and then recovering said alkaloids from their respective desorbing solutions.

12. The process of recovering theobromine and caffein from clay which comprises preferentially desorbing the theobromine from the clay in an aqueous solution having a pH not substantially less than 10.5, desorbing the caffein from the clay in a non-chlorinated, polar, organic solvent, and recovering the theobromine and caffein from their respective desorbing solutions.

13. The process of recovering theobromine and caffein from clay which comprises preferentially desorbing the caffein from the clay in a non-chlorinated, polar, organic solvent, desorbing the theobromine from the clay in an aqueous solution having a pH not substantially less than 10.5, and then recovering the theobromine and caffein from their respective desorbing solutions.

14. The process of recovering theobromine from clay containing adsorbed theobromine and caffein which comprises preferentially desorbing the theobromine from the clay in an aqueous solution having a pH not substantially less than 10.5, and thereafter recovering the theobromine from the desorbing solution.

ROLAND E. KREMERS.

REFERENCES CITED

The following references are of record in the file of this patent:

UNITED STATES PATENTS

| Number | Name | Date |
|---|---|---|
| 1,386,166 | DeGroussequ et al. | Aug. 2, 1921 |

FOREIGN PATENTS

| Number | Country | Date |
|---|---|---|
| 354,942 | British | |

OTHER REFERENCES

Chem. Abstracts, vol. 34, page 588.
Pharm. Zeitung, vol. 82, page 528.
Zechmeister and Cholnoky—Principles and Practice of Chromatography, John Wiley & Sons, Inc., 1941. (Copy in Div. 43.)
J. Phys. Chem., vol. 36, pages 1191–1201 (1932).